UNITED STATES PATENT OFFICE.

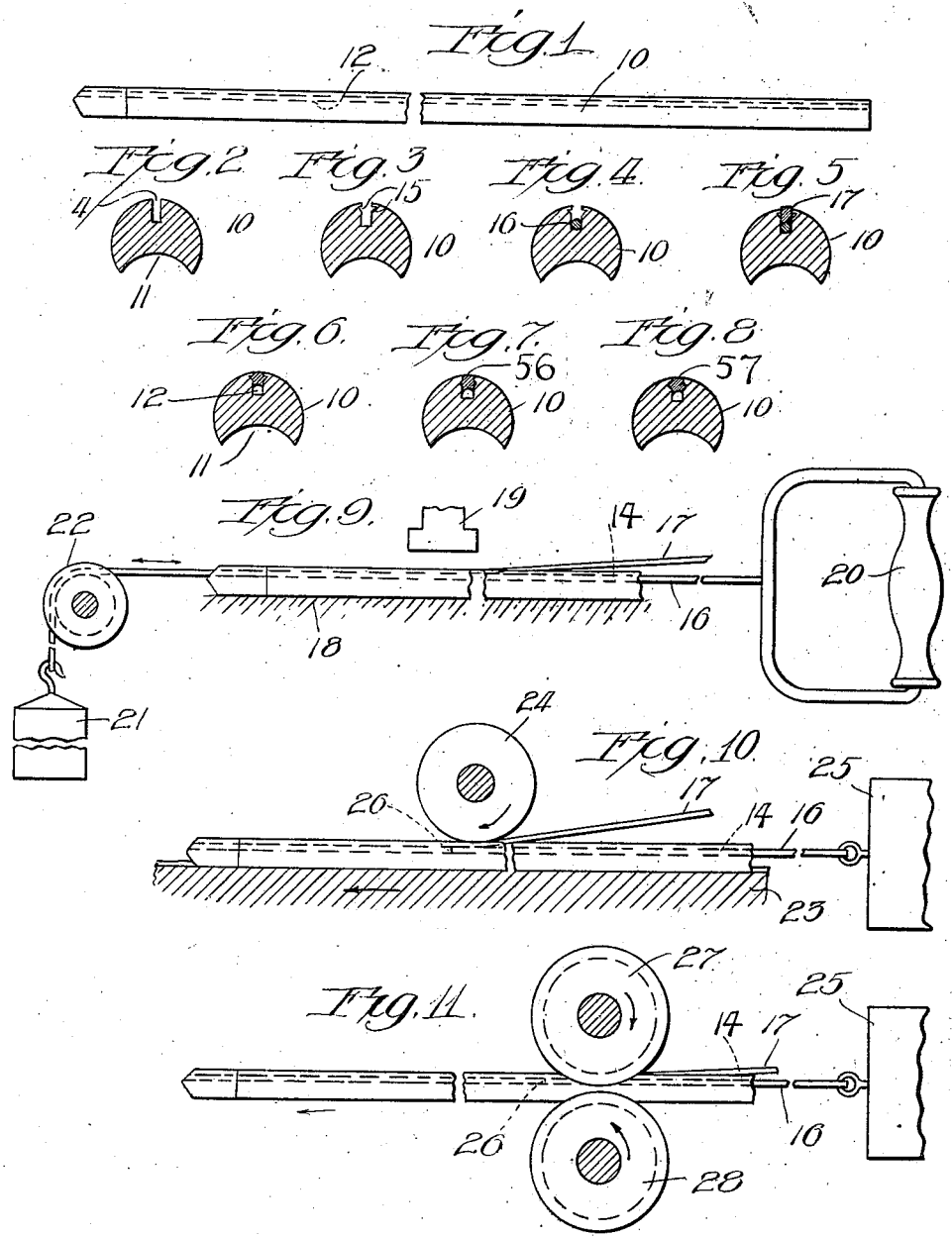

JOHN J. KUNZER, OF CHICAGO, ILLINOIS, ASSIGNOR TO JOSEPH T. RYERSON & SON, OF CHICAGO, ILLINOIS, A CORPORATION OF ILLINOIS.

METHOD OF MAKING DRILLS OR THE LIKE.

1,379,995. Specification of Letters Patent. Patented May 31, 1921.

Application filed August 7, 1918. Serial No. 248,724.

*To all whom it may concern:*

Be it known that I, JOHN J. KUNZER, a citizen of the United States, and a resident of Chicago, in the county of Cook and State of Illinois, have invented certain new and useful Improvements in Methods of Making Drills or the like; and I do hereby declare that the following is a full, clear, and exact description thereof, reference being had to the accompanying drawings, and to the characters of reference marked thereon, which form a part of this specification.

This invention relates to a novel method of making hollow drills and the like for deep drilling, reaming, or other cutting work, such, for instance, as drilling stay bolts for locomotives, drilling gun barrels, and the like, wherein the drill is equipped with a longitudinal duct or ducts through which a cutting compound is forced under pressure to the cutting end of the tool to lubricate said cutting end and to furnish means for flushing the chips outwardly through a longitudinal channel or channels of the drill.

The present invention is an improvement on the method of making deep drills disclosed in my prior application for United States Letters Patent, Serial Number 232,477, and relates to the means for forming the longitudinal oil duct in the shank or bar of the drill.

The object of the invention is to provide an exceedingly simple and effective method for closing the longitudinal groove previously formed in the drill bar to produce the cutting compound duct and also to provide a method for effecting an interlocking connection between the closing or filling element and the walls of the groove to avoid leakage of the cutting or lubricating fluid from the duct around the filling element.

In making a deep drill in accordance with the present method, the drill bar may be longitudinally grooved by a suitable milling or other operation, as in my aforesaid application, either before or after the chip clearance groove has been formed therein. Thereafter the side walls of the groove are formed with longitudinal irregular or under-cut surfaces to receive and interlock with the filling elements which constitutes the outer wall of the cutting fluid conduit, and finally applying the filling element to said groove and interlocking it to the irregular or under-cut walls thereof.

In accordance with one phase of the present invention, the said groove, in which is formed the cutting fluid conduit, is filled at its outer side with a solid piece of material of a character which can be deformed under pressure, so that said filling material may be pressed or forced into the groove and cause to conform to the irregular or under-cut side walls thereof in such manner that the filling material or element is interlocked with the grooved or irregular walls. During the time the filling element is being pressed or forced into the groove, a duct forming strand within the groove, and between the same and the filling element, is maintained in motion, relatively to the drill bar, either by positive movement of the strand or the bar, and the filling element is formed down on the duct forming strand. Therefore, when the filling element is pressed into the groove upon said strand and the strand withdrawn, a duct corresponding to the diameter of the strand remains in the drill bar. The movement of the strand relatively to the drill bar prevents the strand sticking to the walls of the groove or to the filling element so that when the operation is completed the strand may be readily removed from the duct.

Other means, hereinafter described, may be employed for filling the outer side of the groove to produce the cutting fluid duct.

When employing an elongated deformable filling element it may take the form of a wire of proper dimensions, or may be of a cross section to correspond to that of the groove, and said filling element may be hammered into the groove upon the duct forming strand, either by hand or power means; or may be rolled into the groove between one or more rollers at one side and a solid support at the other side, with either the support or the roll or rolls moving in a direction longitudinally of the bar; or between two opposing rolls or pairs of rolls, or by means of a die through which the drill bar, with the filling element applied to the groove thereof may be drawn. In either event, the duct filling strand is maintained in movement relatively to the drill bar so as to prevent the strand sticking in the groove, and to also afford a foundation under the hammer, rolling or pressing means on which to form the upper wall of the duct constituted by the filling element.

The groove may be formed in the bar from end to end thereof when the drill bit is an integral part of the bar. If the drill bit is made of a different quality of material, a hole of the required diameter is drilled through the length of the drill bit in such manner that when it is pressed against and brazed or welded on the end of the drill bar the drill hole therein will conform to the bottom portion of the groove. Also a chip clearance groove is formed in the bit to conform to the chip clearance groove of the drill bar. When the bit is separately formed and brazed or welded to the drill bar, proper means are provided for assuring accurate longitudinal alinement of the bit and the drill bar and to avoid clogging of the opening in the bit during the welding operation.

In the drawings are shown a number of methods of applying the filling material to the slot in the drill bar exterior to the duct forming strand to produce the cutting compound duct, and said methods will hereinafter be described in the order in which they are shown.

In said drawings,—

Figure 1 is a side elevation of a deep drill made in accordance with my novel process.

Figs. 2, 3, 4, 5, and 6 are cross sections of the drill bar illustrating the several steps of producing the finished duct shown in Fig. 6.

Figs. 7 and 8 illustrate modifications of the interlocking connection between the filling element and the walls of the groove to form the duct.

Fig. 9 illustrates a method of hammering the filling element in said groove.

Fig. 10 illustrates a method of rolling the filling element in said groove between a roller and solid support or bed.

Fig. 11 illustrates a method of rolling the filling material in the groove between two rolling surfaces.

Figure 12:
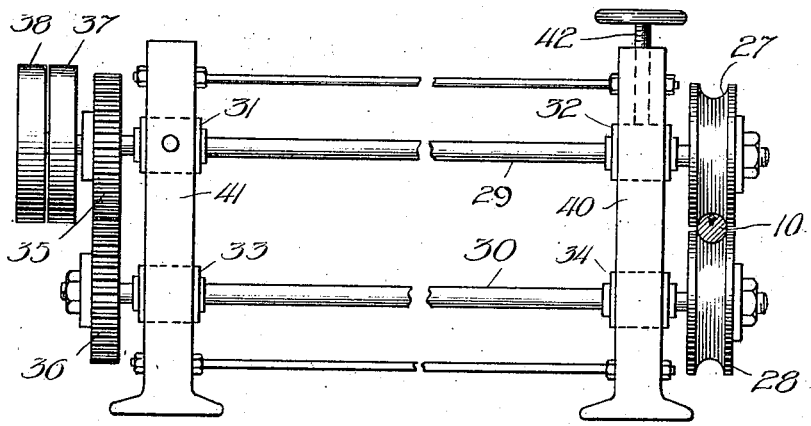
Fig. 12 illustrates a suitable form of machine for practising the method indicated in Fig. 11.

As shown in Figs. 1 to 6, inclusive, of the drawings, 10 designates the shank or bar of the drill. 11 designates a longitudinal chip clearance groove at one side and extending from end to end thereof, and 12 (Fig. 6) designates a cutting compound duct extending longitudinally of the drill from end to end. Said duct is also indicated in dotted lines of Fig. 1. In the side of the bar opposite to the chip clearance groove 11 is formed, by a suitable milling or other operation, a narrow groove 14. This groove may be formed in the bar when the latter is drawn or rolled.

The side walls of said groove 14 are thereafter operated on to produce irregular faces. For instance, as shown in Fig. 3, the said side walls are inwardly recessed to produce longitudinal under-cut recesses 15, preferably near the outer side of the groove. If the drill bit be made of hardened steel, it is drilled to produce a longitudinal hole of a diameter corresponding to the duct 12 and is thereafter brazed or welded to the end of the drill bar. It is so applied to the end of the bar that the drill hole in said bit is in alinement with the bottom portion of the groove 14. The chip clearance groove may be formed in the bar either before or after the groove 14 is cut.

After the bit has been brazed or welded to the bar, a conduit forming strand 16 is laid in the bottom of the groove 14, with its end extending into or through the opening in the drill bit, if the latter be separately made and brazed or welded to the bar, as indicated in Fig. 4. Thereafter a strand of filling material, hereinbefore termed a filling element, 17 is applied over or to the outer open side of the groove 14. Said filling element may either be a round wire of proper diameter or may be of a cross section to conform to and fit within the open side of the groove 14. The latter cross section is shown in Fig. 5. After the filling element has been applied to the open side of the groove, force is exerted on said filling element to press it into the groove 14; and said filling element is made of a readily deformable material, such, for instance, as copper, so that pressure applied through the medium of hammer means, rolling means, or die means, will not only force the material of the filling element into the groove but will spread the material laterally outwardly when in said groove to fill the under-cut recesses 15 and thereby interlock the filling element to the bar.

During the time the filling element is being thus applied to and forced or pressed in the groove 14 the duct forming strand 16 is moved relatively to the bar and the filling element, either by positive movement of the strand or bar, so as to prevent the duct forming strand sticking to the walls of the duct thus formed. When the filling element is pressed throughout its length into said groove and the duct forming strand 16 removed, a clean duct of uniform diameter throughout its length is formed in the drill bar.

As shown in Fig. 9, the filling element is forced into the groove 14 of the bar by a hammering operation. The bar is fixedly sustained on a bed 18; being, in practice, held thereon by suitable vise or clamping means not necessary to be herein shown. 19 indicates a hammer by which the filling element is forced or hammered into the groove 14 and is upset or formed on the duct forming strand. It may be a manually operated hammer or a machine operated hammer. It may be assumed, in the arrangement shown in Fig. 9, that the hammer is moved from one end (the cutting end as herein shown), to the other end as the filling element is forced into the groove; or alternatively the bed 18 may be shifted endwise of the axis of the drill bar and the hammer operated in one vertical plane only.

As shown in said Fig. 9, the duct forming strand will be moved relatively to the drill bar when the hammer is moved along the fixed support 18 and, for this purpose, said duct forming strand may be attached at one end to a hand piece 20 and at its other end to a weight 21 and trained between said weight and the drill bar over a guide pulley 22. With this construction the strand is shifted in one direction by power applied to the hand piece 20 during the hammering operation and is moved in the other direction through the action of the weight 21. After the filling element has been fully pressed into the groove of the drill bar, the strand is detached at one of its ends from its actuating means and removed endwise from the resultant duct 12.

In the arrangement shown in Fig. 10, the filling element 17 is pressed or forced into the groove of the drill bar between a bed 23 and an overhead roller 24. As indicated in said Fig. 10, the said bed is movable under the roller 24, the latter rotating on a fixed axis. In this arrangement, the duct forming strand 16 is anchored at one end to a fixed support 25. The end of the strand remote from its point of anchorage lies in the groove 14 just beyond the point of pressure applied by the roll, as indicated at 26 in Fig. 10. As the bed 23 moves away from the fixed anchor 25 the said bed, carrying with it the drill bar supported and fastened thereon in any suitable manner, moves relatively to the strand and the end 26 of the strand will always retain its relative position to the point of application of pressure by the roller 24 as indicated in said Fig. 10. Therefore, when the filling element has been fully pressed or rolled in the groove 14, the duct forming strand 16 extends but a short distance within the resultant duct and may be readily withdrawn therefrom. This arrangement permits the filling element to be forced or pressed into the groove with greater force than in the construction shown in Fig. 9, while permitting the duct forming strand to be readily released from the drill bar.

The same mode of manipulating the duct forming strand 16 may be employed in the construction shown in Fig. 9 if the bed or support 18 by endwise movement be shifted relative to a fixed position of the hammer 19.

In the arrangement shown in Fig. 11, the filling element 17 is pressed in the groove 14 between opposing, coacting rollers 27, 28. Said rollers 27, 28 may be assumed to rotate on fixed axes. The duct forming strand 16 is anchored to a fixed support 25, as in arrangement shown in Fig. 10. The faces of the rollers 27, 28, which contact with the drill bar preferably will be roughened so as to cause the drill bar to travel therebetween as the rollers rotate. It will be understood that the end 26 of the duct forming strand will always maintain a position at or just in rear of the pressure area between the rollers 27, 28, so that as the drill bar is forced endwise by the coaction of the rollers 27, 28, said bar has movement relatively to the duct forming strand to prevent the latter sticking against the walls of the duct thus formed.

In Fig. 12 is shown a machine which may be conveniently employed for practising the method illustrated in Fig. 11. In said Fig. 12, the rollers 27, 28 are fixed on the ends of shafts 29, 30, respectively, which are rotatively mounted in upper and lower bearing boxes 31, 32, 33, 34. Said shafts 29, 30 are provided at their ends remote from the rollers 27, 28 with intermeshing spur gears 35, 36, respectively, and the shaft 29 is provided beyond its spur gear with tight and loose pulleys 37, 38, respectively. The bearing box 32 at one end of the shaft 29 is adapted for vertical adjustment in its standard 40. The other bearing box 31 for said shaft is shown as pivotally mounted in the standard 14. The vertically adjustable bearing box is shown as adapted to be pressed downwardly to effect the proper coaction of the rollers 27, 28 on the interposed drill bar 10 through the medium of an adjusting screw 42.

Figure 13:
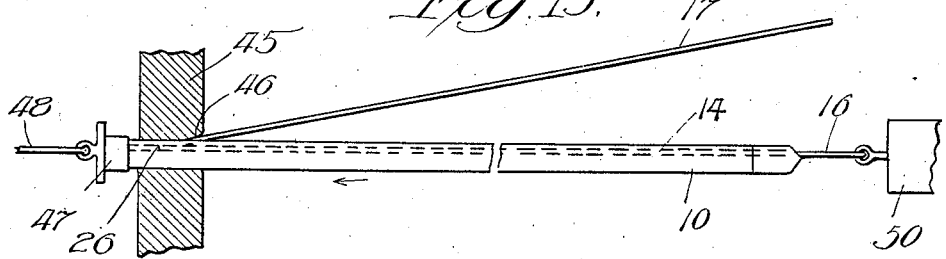
Fig. 13 illustrates another method of forcing the filling element in the groove.

In Fig. 13 is shown an arrangement whereby a die 45 is employed to force the filling element 17 in the groove 14 of the drill bar 10. As shown in said Fig. 13 the die is formed at one side, or that side adjacent to the groove of the bar 10, with a clearance 46 so shaped as to permit the drill bar, with the filling element, entered at one end therein, to pass into and through the opening of the die. The said drill bar is adapted to be grasped by any suitable form of clamp 47 to which power may be applied through a cable 48 to draw the drill bar, together with the groove filling element 17, through the fixed die 45. The duct forming strand 16 is anchored at the end of the drill remote from the die to a fixed support 50 and extends at its end remote from its point of anchorage to a point at or beyond the center line of the die, as indicated at 26.

In operation, the end of the drill bar beyond the die is, by proper force applied through the cable 48, drawn through the die, and the forming face of the die presses the filling element in the groove 14 and upsets it over or forms it on the duct forming strand. In this instance, the duct forming strand 16 is stationary while the drill bar moves, and said duct forming strand does not extend at any time but a short distance into the pressure area of the die.

Figure 14:
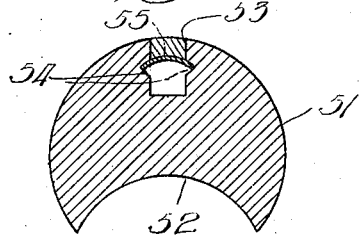
Fig. 14 is a cross section illustrating still a further modification.

In Fig. 14 is shown a further modification. As shown in said figure, the drill bar 51 is formed at one side with longitudinal chip clearance groove 52 and at its other side with a longitudinal groove 53 corresponding to the groove 14 of the drill bars hereinbefore referred to. The side walls of said grooves 53 are formed with opposed undercut longitudinal recesses 54. 55 designates a bridge member of some suitable yielding material, as relatively soft copper or brass, that is adapted to be inserted into the groove 53 and is sufficiently yieldable transversely thereof, so that one edge may be inserted in one of the recesses 54 and the other edge in the other recess. That portion of the groove exterior the bridge member 55 may be filled with any suitable filling material.

The groove walls may in some instances be unnotched, in which event a strand will be laid in the groove to support the bridge member while the bridge member is forced into the groove above the strand and while the groove exterior to the bridge member is being filled.

The drill bars shown in Figs. 7 and 8 differ from that shown in Figs. 2 to 6, inclusive, only in respect of the contour of the irregular walls of the grooves thereof to receive the filling element 56, 57, respectively.

I claim as my invention:

1. The improved method of making drills having longitudinal lubricating ducts, which consists in laying a duct forming strand in a longitudinal undercut groove of the drill bar, pressing a solid elongated deformable filler element in said groove and forming it against the undercut of said groove and on the strand, effecting relative longitudinal movement of the bar and strand during the forming operation, and finally withdrawing the duct forming strand.

2. The improved method of making drills having longitudinal lubricating ducts, which consists in laying a duct forming strand in a longitudinal undercut sided groove in said bar, pressing a solid deformable elongated filler element in said groove and forming it in the groove and on the strand, and finally withdrawing the strand.

3. The improved method of making drills having longitudinal lubricating ducts, which consists in forming locking faces on the walls of a groove in the drill bar, laying a duct forming strand in the groove, pressing a deformable filler element in said groove and forming it on the strand and on said locking faces, effecting relative endwise movement of the strand and bar during the forming operation, and finally withdrawing said strand.

4. The improved method of making drills having longitudinal lubricating ducts, which consists in forming longitudinal under-cut recesses in the side walls of a longitudinal groove in the drill bar and pressing an elongated deformable filler element in said groove and interlocking the material thereof with the recessed walls of the groove.

5. The improved method of making drills having longitudinal lubricating ducts, which consists in forming longitudinal under-cut recesses in the walls of a groove in the drill bar, pressing an elongated deformable filler element in said groove and interlocking the material thereof with the recessed walls of the groove, and limiting the entrance of the filler element short of the bottom of said groove.

6. The improved method of making drills having longitudinal lubricating ducts, which consists in forming longitudinal under-cut recesses in the walls of a groove in the drill bar, laying a duct forming strand in the groove, pressing an elongated deformable filler element in said groove and forming it on the strand and in said recesses, effecting relative endwise movement of the bar and strand during the forming operation, and finally withdrawing the strand.

7. The improved method of making drills having longitudinal lubricating ducts, which comprises the steps of forming a longitudinal groove in the drill bar, laying a duct-forming strand in the groove, pressing an elongated deformable filler element in said groove by a rolling operation to form the material of said element on said strand and against the walls of the groove, maintaining relative endwise movement of the strand and bar during the forming operation, and finally withdrawing the strand.

8. The improved method of making drills having longitudinal lubricating ducts, which comprises the steps of laying a duct-forming strand in a groove in the drill bar, pressing an elongated deformable filler element in said groove between a flat support for the bar and a roller to form the material of said element on said strand and against the walls of the groove, effecting relative endwise movement of the strand and bar during the forming operation, and finally withdrawing the strand.

9. The improved method of making drills having longitudinal lubricating ducts, comprising the steps of laying a duct-forming strand in a groove of the drill bar, pressing an elongated deformable filler element in said groove between a flat support for the bar and a roller to form the material of said element on said strand and against the walls of the groove, anchoring one end of the duct forming strand, causing said flat support to move with the drill bar relatively to the strand during the forming operation, and finally withdrawing the strand.

10. The improved method of making drills having longitudinal lubricating ducts, which comprises the steps of forming a longitudinal groove in the drill bar, forming longitudinal under-cut recesses in the walls of the groove and applying a filler element in said groove and interlocking it with said recesses.

In testimony whereof I claim the foregoing as my invention, I hereunto append my signature at Chicago, Illinois, this 17 day of July, 1918.

JOHN J. KUNZER.